(12) United States Patent
Goto (10) Patent No.: US 8,547,944 B2
(45) Date of Patent: Oct. 1, 2013

(54) COMMUNICATION APPARATUS, COMMUNICATION METHOD, PROGRAM AND STORAGE MEDIUM

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 12/809,151

(22) PCT Filed: Jan. 21, 2009

(86) PCT No.: PCT/JP2009/051289
§ 371 (c)(1),
(2), (4) Date: Jun. 18, 2010

(87) PCT Pub. No.: WO2009/104458
PCT Pub. Date: Aug. 27, 2009

(65) Prior Publication Data
US 2011/0200025 A1 Aug. 18, 2011

(30) Foreign Application Priority Data
Feb. 22, 2008 (JP) ................................. 2008-041490

(51) Int. Cl.
*H04W 4/00* (2009.01)

(52) U.S. Cl.
USPC ........................................................ 370/338

(58) Field of Classification Search
None
See application file for complete search history.

(56) References Cited

U.S. PATENT DOCUMENTS

| | | | | |
|---|---|---|---|---|
| 6,691,227 B1 * | 2/2004 | Neves et al. | ................. | 713/162 |
| 2002/0128035 A1 * | 9/2002 | Jokinen et al. | ................. | 455/552 |
| 2005/0232161 A1 * | 10/2005 | Maufer et al. | ................. | 370/252 |
| 2008/0316989 A1 * | 12/2008 | Balogh | ........................ | 370/338 |
| 2009/0037559 A1 * | 2/2009 | Ran | ............................... | 709/219 |
| 2009/0135759 A1 * | 5/2009 | Hirano et al. | ................. | 370/328 |
| 2009/0158032 A1 * | 6/2009 | Costa et al. | ................... | 713/156 |
| 2010/0228980 A1 * | 9/2010 | Falk et al. | ..................... | 713/171 |

FOREIGN PATENT DOCUMENTS

| | | |
|---|---|---|
| GB | 2360914 A | 10/2001 |
| JP | 2002-027558 A | 1/2002 |
| JP | 2006-502678 A | 1/2006 |
| WO | 01/63843 A1 | 8/2001 |
| WO | 2004/031488 A1 | 4/2004 |

OTHER PUBLICATIONS

"This is a true wireless LAN!" Motonori Shindo, Network World, IDG, V. 10, No. 5, pp. 82-92, Japan.

(Continued)

*Primary Examiner* — John Blanton
(74) *Attorney, Agent, or Firm* — Fitzpatrick, Cella, Harper & Scinto (57) ABSTRACT

A communication apparatus (101) includes: receiving means for receiving a communication parameter, which is necessary for communication, from another communication apparatus; storage means (103, 212) for storing the communication parameter; first detecting means for detecting a connection instruction for connection to a network; and connecting means which, if the connection instruction (S401) has been detected by the first detecting means, is for executing processing for connecting to the network using a communication parameter already stored in the storage means (212), or processing for connecting to the network after a communication parameter is received from another communication apparatus by the receiving means, in accordance with the type of communication parameter already stored in the storage means (212).

11 Claims, 5 Drawing Sheets

(56) References Cited

OTHER PUBLICATIONS

Cynthia Kuo, et al., "Low-Cost Manufacturing, Usability, and Security: An Analysis of Bluetooth Simple Pairing and Wi-Fi Protected Setup", Financial Cryptography and Data Security, [Lecture Notes in Computer Science], Springer Berlin Heidelberg, Berlin, Heidelberg, vol. 4886, Feb. 12, 2007, pp. 325-340, XP019085841.

May 6, 2009 International Search Report and Written Opinion in International Patent Appln. No. PCT/JP2009/051289.

* cited by examiner

COMMUNICATION APPARATUS, COMMUNICATION METHOD, PROGRAM AND STORAGE MEDIUM

TECHNICAL FIELD

The present invention relates to a communication apparatus, a communication method and program, and to a storage medium storing the program.

BACKGROUND ART

In wireless communication typified by that performed by a wireless LAN compliant with IEEE 802.11, there are a large number of setting items that must be set before use.

Examples of setting items are communication parameters necessary in order to carry out wireless communication, such as an SSID serving as a network identifier, an encryption method, an encryption key, an authentication method and an authentication key. Setting these by manual input performed by a user is very troublesome.

Accordingly, various manufacturers have proposed automatic setting methods for setting communication parameters in wireless devices in simple fashion. According to these automatic setting methods, communication parameters are provided from one device to another device based upon a procedure and messages predetermined between the devices to be connected, and the setting of the communication parameters is performed automatically.

An example of automatic setting of communication parameters has been disclosed in Wi-Fi (certified trademark) for Wi-Fi Protected Setup: Easing the User Experience for Home and Small Office Wi-Fi (R) Networks, http://www.wi-fi.org/wp/wifi-protected-setup (referred to as a "Wi-Fi protected setup document" below).

There are two methods of setting communication parameters automatically, namely a method in which the user inputs an authentication code to the device (referred to as an "authentication code method" below) and a method in which an authentication code is not input (referred to as a "non-authentication code method" below) (see the Wi-Fi protected setup document).

According to the authentication code method, an authentication code is shared between devices, authentication processing is executed by each of the devices and setup processing is executed between devices where authentication processing has succeeded. In this case, it becomes possible for a device to transfer communication parameters safely by authentication processing.

According to the non-authentication code method, when a terminal that has initiated automatic setting of communication parameters is detected, the communication parameters are provided to this device automatically. One example of a non-authentication code method is a method of starting setup processing by pressing a setting start button provided on a device and, during execution of this setup processing, performing automatic setup between this device and another device that has started setup processing is similar fashion. Although the non-authentication code method is inferior to the authentication code method in terms of security, it has the advantage of simple operation because the user need not input an authentication code.

Thus, the user is capable of setting communication parameters in a wireless device through a simple operation, and the wireless device can be connected to a network in simple fashion by using the communication parameters that have been set.

In the prior art, set communication parameters change explicitly once they are set, or they do not change unless the automatic setting of the communication parameters is performed again.

With regard to reconnection processing following inadvertent severance of communication, whether re-connection is possible with communication parameters once set cannot be easily determined. Before re-connection is attempted, therefore, the user must first investigate the status of the network to which the connection is to be made. Furthermore, based upon the result of this investigation of network status, the user must select whether to execute automatic setting of communication parameters again or to execute connection processing using the already set communication parameters.

DISCLOSURE OF INVENTION

The present invention alleviates user operation when an attempt is made to effect re-connection after a communication device for which automatic setup of communication parameters has already been completed leaves a network.

According to one aspect of the present invention, a communication apparatus includes: receiving means for receiving a communication parameter, which is necessary for communication, from another communication apparatus; storage means for storing the communication parameter; first detecting means for detecting a connection instruction for connection to a network; and connecting means which, if the connection instruction has been detected by the first detecting means, is for executing processing for connecting to the network using a communication parameter already stored in the storage means, or processing for connecting to the network after a communication parameter is received from another communication apparatus by the receiving means, in accordance with the type of communication parameter already stored in the storage means.

According to another aspect of the present invention, a control method of a communication apparatus, includes: a receiving step of receiving a communication parameter, which is necessary for communication, from another communication apparatus; a storage step of storing the communication parameter in a storage unit; a detecting step of detecting a connection instruction for connection to a network; and if the connection instruction has been detected at the detecting step, a connecting step of executing processing for connecting to the network using a communication parameter already stored at the storage step, or processing for connecting to the network after a communication parameter is received from another communication apparatus at the receiving step, in accordance with the type of communication parameter already stored at the storage step.

According to still another aspect of the present invention, a program for causing a control method by a communication apparatus to be executed by computer, the method includes: a receiving step of receiving a communication parameter, which is necessary for communication, from another communication apparatus; a storage step of storing the communication parameter in a storage unit; a detecting step of detecting a connection instruction for connection to a network; and if the connection instruction has been detected at the detecting step, a connecting step of executing processing for connecting to the network using a communication parameter already stored at the storage step, or processing for connecting to the network after a communication parameter is received from another communication apparatus at the receiving step, in accordance with the type of communication parameter already stored at the storage step.

Further features of the present invention will become apparent from the following description of exemplary embodiments (with reference to the attached drawings).

BEST MODE FOR CARRYING OUT THE INVENTION

A communication apparatus according to a preferred embodiment of the present invention will now be described in detail with reference to the drawings. Although the apparatus will be described with regard to an example using a wireless LAN system compliant with IEEE 802.11, the form of communication is not necessarily limited to a wireless LAN system compliant with IEEE 802.11.

The hardware configuration of the apparatus according to this embodiment will be described first.

Figure 1:
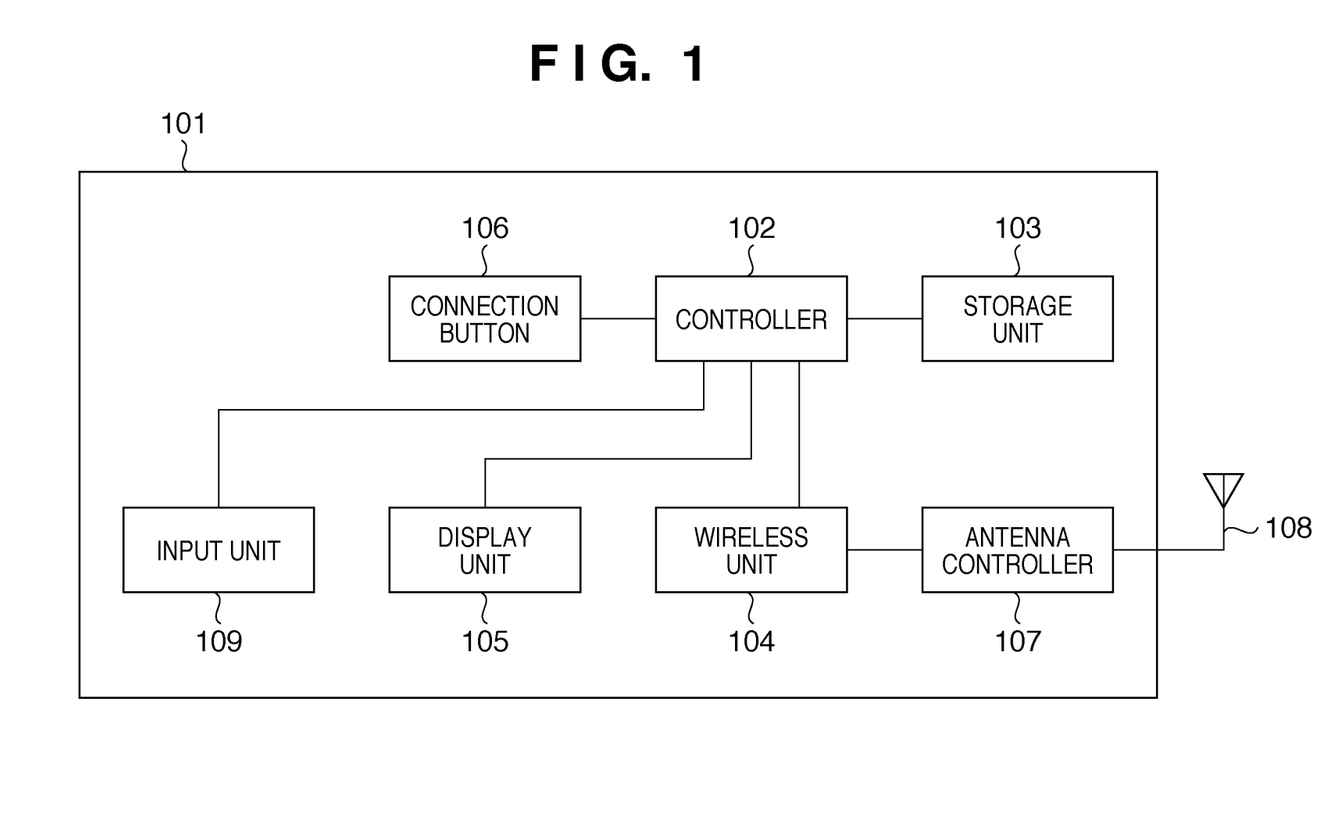
FIG. 1 is a block diagram illustrating the configuration of a terminal.
Figure 4:
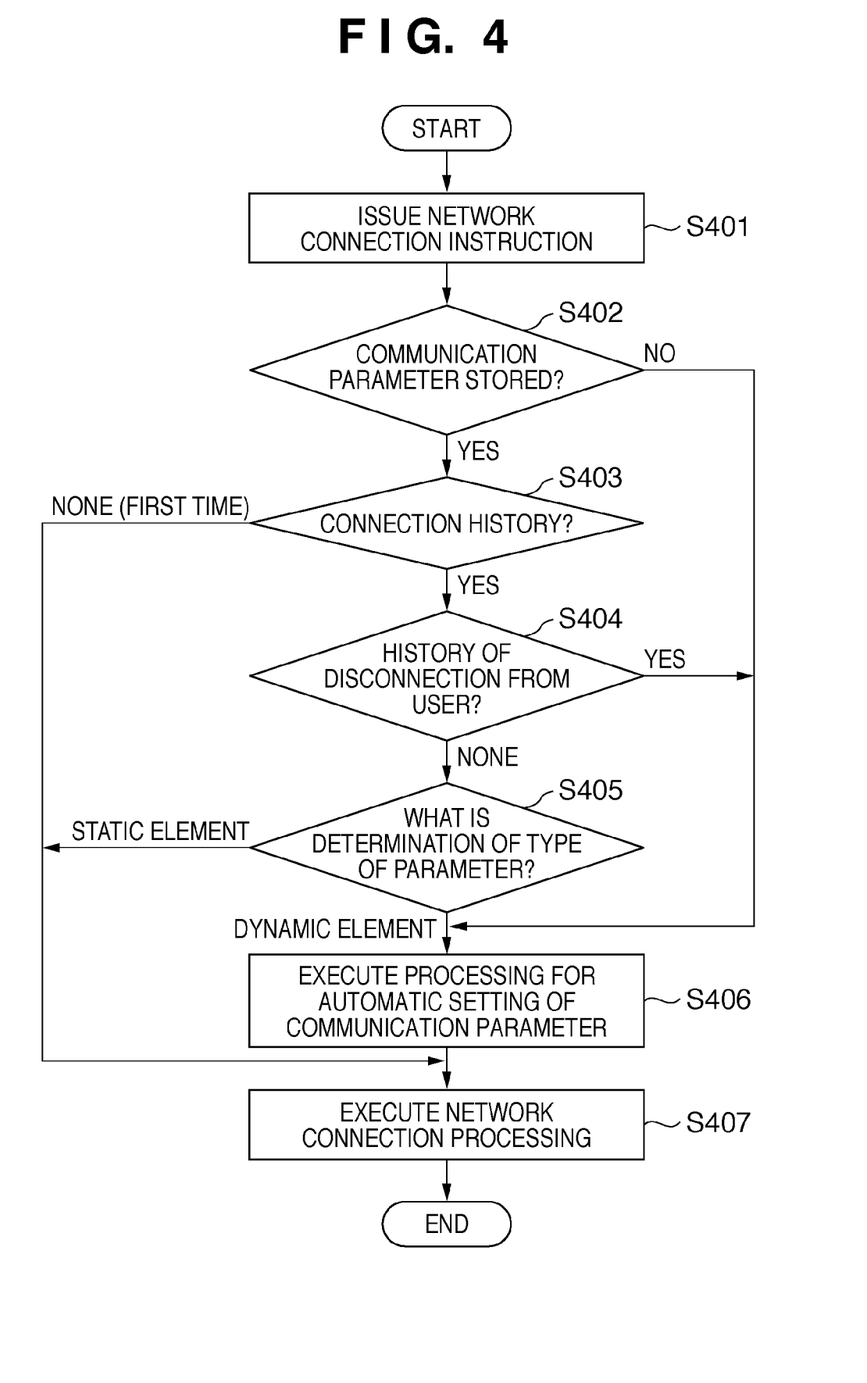
FIG. 4 is a flowchart illustrating a connection operation of a communication apparatus according to an embodiment.

FIG. 1 is a block diagram illustrating an example of the arrangement of units, described later, according to an embodiment to which the present invention can be applied. The overall apparatus, indicated at 101, includes a controller 102 for controlling the overall apparatus by executing a control program stored in a storage unit 103. The controller 102 also controls the setting of communication parameters between this apparatus and another apparatus. The storage unit 103 stores the control program executed by the controller 102 and various information such as communication parameters. Various operations, described later, are carried out by using the controller 102 to execute the control program stored in the storage unit 103. A wireless unit 104 performs wireless communication. A display unit 105 for presenting various displays has a function for outputting visually perceivable information in the manner of an LCD or LED or a function for outputting sound information in the manner of a speaker. A connection button 106 is for allowing a user to issue a connection command to a network. In response to operation of the connection button 106 by the user, processing for connecting to the network using communication parameters already stored in the storage unit 103, or processing for connecting to the network using communication parameters received from an apparatus that is a provider of the communication parameters, is executed.

Upon detecting operation of the connection button 106 by the user, the controller 102 executes the processing of FIG. 4, described later. An antenna controller 107 controls an antenna 108. An input unit 109 is operated by the user in order to instruct the execution of processing for disconnecting from the network, as will be described later.

Figure 2:
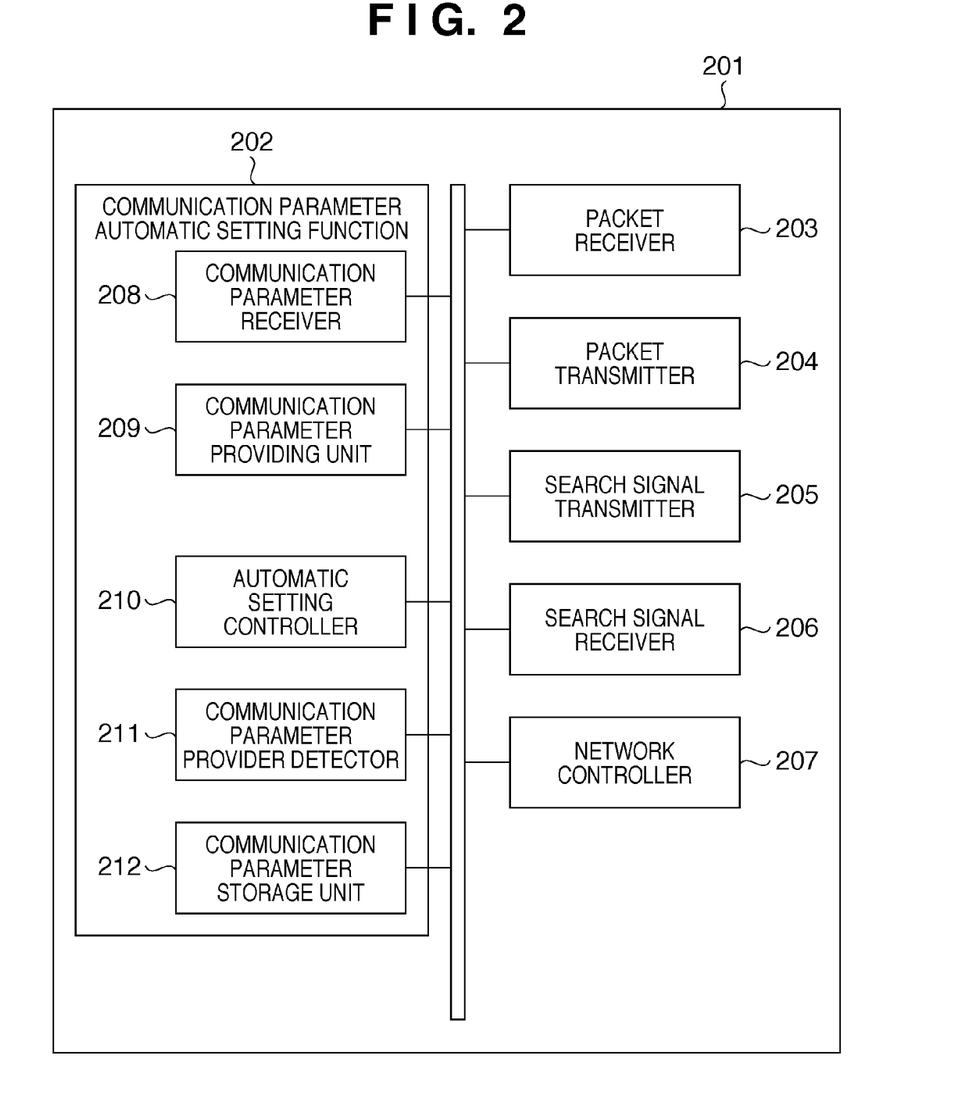
FIG. 2 is a block diagram of software functions within a terminal according to an embodiment of the present invention.

FIG. 2 is a block diagram illustrating an example of arrangement of software functions implemented by an apparatus that provides a function for setting communication parameters, described later.

The overall apparatus, indicated at 201, includes a function block 202 for automatic setting of communication parameters. In this embodiment, this function block executes automatic setting of communication parameters necessary in order to carry out wireless communication, examples of such communication parameters being an SSID serving as a network identifier, an encryption method, an encryption key, an authentication method and an authentication key. Further, according to this embodiment, the apparatus employs two methods of setting communication parameters automatically, namely an authentication code method and a non-authentication code method. A packet receiver 203 receives packets relating to a variety of communications. A packet transmitter 204 transmits packets relating to a variety of communications. A search signal transmitter 205 controls the transmission of a device search signal such as a probe request. A probe request can also be referred to as a network search signal for searching for a desired network. Transmission of the probe request is carried out by the search signal transmitter 205. Transmission of a probe response, which is a signal that is in response to the received probe request, also is carried out by the search signal transmitter 205.

A search signal receiver 206 controls reception of the device search signal, such as the probe request, from another apparatus. Receipt of the probe request is performed by the search signal receiver 206. Receipt of the probe response also is performed by the search signal receiver 206.

Figure 5:
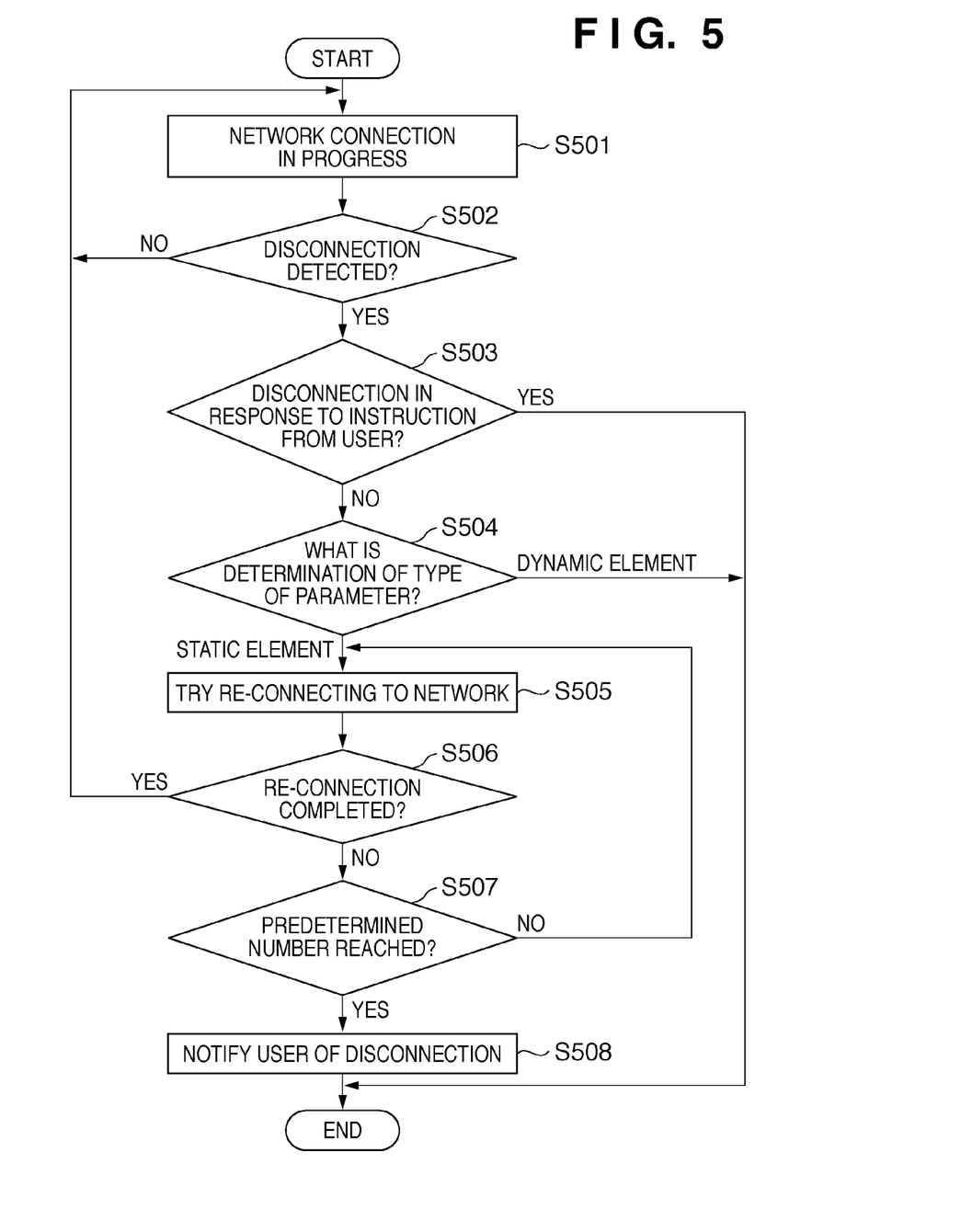
FIG. 5 is flowchart illustrating a disconnection operation of a communication apparatus according to an embodiment.

A network controller 207 controls the network connection. The processing shown in FIGS. 4 and 5 is executed by the network controller 207. In the function block 202 for automatic setting of communication parameters, a communication parameter receiver 208 receives communication parameters from the device of another party. A communication parameter providing unit 209 provides communication parameters to the device of another party. An automatic setting controller 210 controls various protocols used in automatic setting of communication parameters. Processing for automatically setting communication parameters, described later, is executed by the communication parameter receiver 208 and communication parameter providing unit 209 based upon control performed by the automatic setting controller 210.

A source detector 211 detects the provider of communication parameters. Specifically, the source detector 211 detects the apparatus that is the source of provision of communication parameters based upon the transmission of the search signal and the response thereto performed by the search signal transmitter 205 and search signal receiver 206. In a case where provision of communication parameters is received, the detected source apparatus is requested for provision of the communication parameters and the provision of the communication parameters is received.

A communication parameter storage unit 212 stores communication parameters the provision of which is received from the provider apparatus. It should be noted that the communication parameter storage unit 212 corresponds to the storage unit 103.

Figure 3:
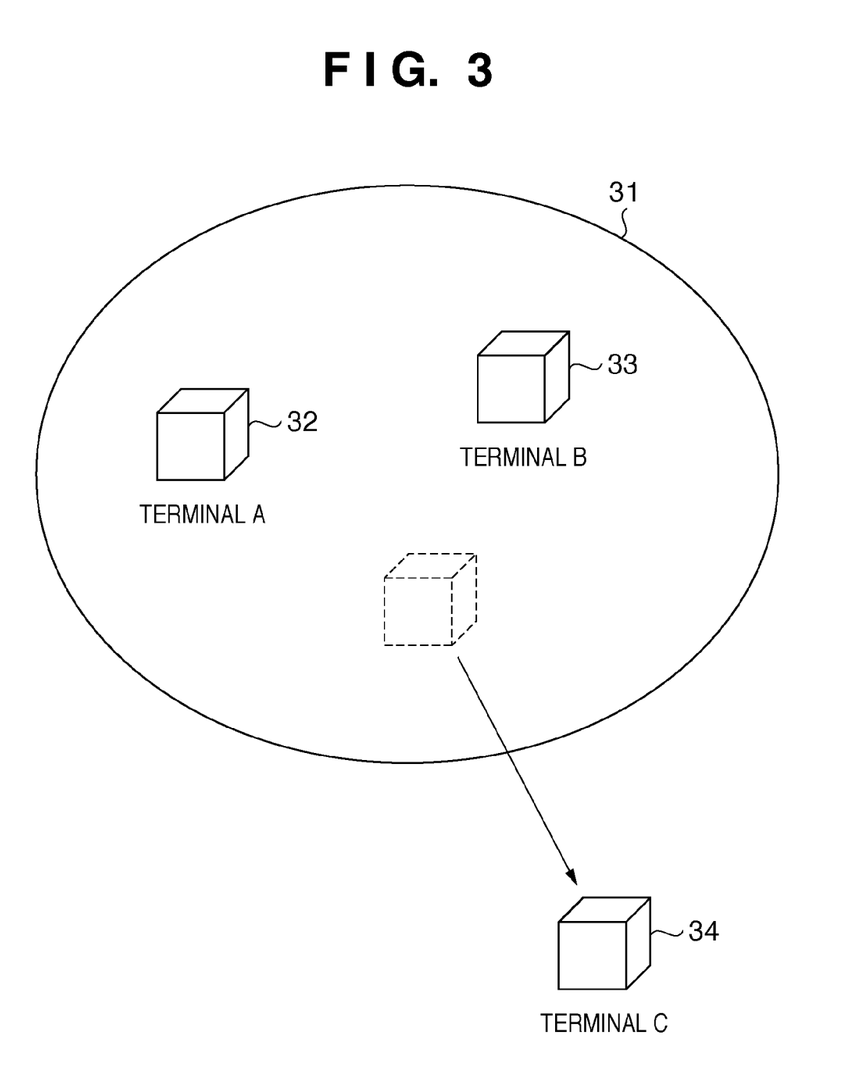
FIG. 3 is a diagram illustrating configuration of a network according to an embodiment.

FIG. 3 is a diagram illustrating a terminal 303, a terminal 305 and a terminal 304, which are referred to as terminals A, B and C, respectively, below. All of these terminals have the structure shown in FIGS. 1 and 2 described above.

The terminals A and B construct a network 31. Consider a case where terminal C is connected to and joins the network 31, and a case where the terminal C leaves the network 31.

Terminal A serves as the provider of communication parameters and stores configuration information relating to the network 31. The automatic setting of communication parameters has already been completed for terminal B for the purpose of communicating with terminal A. It should be noted that if terminal A operates as the provider of the communication parameters, it may be a wireless LAN access point.

FIG. 4 is a flowchart illustrating the flow of operation through which terminal C is connected to and joins the network 31.

If an instruction for connecting terminal C to the network 31 is issued by user operation of the connection button 106 or by issuance of the instruction from the control software that controls terminal C (S401), then control proceeds to step S402. It should be noted that the connection to the network 31 has still not been made at this time.

In order for terminal C to connect to and join the network 31, information concerning the communication parameter relating to network 31 to which connection is being attempted is required. Accordingly, terminal C determines whether the communication parameter has been stored in the storage unit 103 (S402).

If it is determined by the determination processing at S402 that communication parameter has not been stored, then processing for setting the communication parameter automatically is executed in order that provision of the communication parameter from terminal A may be received (S406). The processing for setting the communication parameter automatically is executed by the function 202 for automatic setting of communication parameters.

If provision of the communication parameter is received from terminal A at S406, then processing for connecting to the network 31 is executed using this communication parameter (S407).

On the other and, if it is determined by the determination processing at S402 that terminal C already stores communication parameters, then control proceeds to step S403.

At step S403, terminal C determines whether processing for connecting to the network has ever been executed using the stored communication parameters (S403). In other words, terminal C determines whether there is a history of connection to the network using the stored communication parameters.

If the result of this determination is that connection processing has never been executed even a single time, there is the possibility that this moment is immediately after completion of processing for automatic setting of the communication parameters. Accordingly, processing for connecting to the network 31 is executed using these communication parameters as is (S407).

If the result of the determination at S403 is that a connection has been made to the network 31 using the communication parameters stored in the terminal itself, then it is determined whether there is a history of a disconnection instruction from the user with regard to this connection (S404).

If the result of the determination at S404 is that disconnection from the network has been requested by user operation and that processing for disconnection from the network has been executed, then control proceeds to step S406. Here processing for automatic setting of communication parameters is executed in order to receive the provision of communication parameter from terminal A again (S406). If the communication parameter is received, then processing for connecting to the network 31 is executed at step S407 using the communication parameter provided.

Next, if the result of the determination at S404 is that disconnection from the network has never been requested by the user even a single time, then control proceeds to step S405. If disconnection has not been requested by the user, there is a possibility that disconnection has occurred because the user has left the network unintentionally owing to deterioration in the surrounding radio wave environment or excessive distance from terminal A or B, and that an instruction for re-connection was issued at step S401. In this case the type of communication parameter is discriminated (S405).

The type of communication parameter depends upon whether a communication parameter has a dynamic component, e.g., whether an encryption key is updated periodically or is a fixed value and is not updated periodically. If at least part of a communication parameter includes an element that changes dynamically with the passage of time, then the communication parameter is judged to be a dynamic element. If a communication parameter does not include an element that changes dynamically with the passage of time, then the communication parameter is judged to be a static element. For example, there is a case where an encryption key is a fixed value, as in the manner of a WEP key, and there is a case where an encryption key is updated periodically as in the manner of a TKIP key or AES key in a WPA authentication scheme. For the former it is assumed that the type of communication parameter has a static element, and for the latter it is assumed that the type of communication parameter has a dynamic element. It should be noted that "WEP" is the abbreviation of "Wired Equivalent Privacy", and reference should be had to the IEEE 802.11 standard for the details. The WPA authentication scheme is an encryption standard stipulated by the Wi-Fi Alliance. "TKIP" is the abbreviation of "Temporal Key Integrity Protocol", and "AES" is the abbreviation of "Advanced Encryption Standard".

This embodiment will be described taking an encryption key as an example of one type of communication parameter. However, the element may be another parameter element and not an encryption key so long as the element varies with time. Accordingly, if SSID, for example, which is a network identifier, is changed periodically as the setting of the terminal, then the SSID may be adopted as the type of communication parameter.

If the result of the determination at S405 is that a communication parameter is a fixed element, then network connection processing is attempted using the stored communication parameter as is (S407).

On the other hand, if it is determined at S405 that the communication parameter is a dynamic element, then even if an attempt is made to re-connect to the network 31 using the communication parameter that has been stored in terminal C, it is highly likely that the communication parameter has changed and that re-connection to the network 31 cannot be achieved. Accordingly, processing for automatic setting of the communication parameter is executed again at step S406 and provision of a different communication parameter from terminal A is received (S407). Then, at step S407, processing for connecting to the network 31 is executed using the communication parameter newly provided.

In accordance with the foregoing, it is possible to alleviate user operation and improve connectability at execution of processing for automatic setting of communication parameters and execution of connection processing using the communication parameters set automatically. Further, in a case where a command for connection to a network is issued after the user has issued a disconnection instruction, the connection to the network is made after the provision of communication parameters is received again. By virtue of this arrangement, the term of validity of a communication parameter can be made to last until disconnection is instructed by the user, thereby enhancing network security. Further, in a case where connection to a network has been instructed despite the fact that the user has not instructed that disconnection be performed, the occurrence of a disconnection due to some incidental cause is conceivable. Accordingly, since whether to use an already acquired communication parameter or to receive the provision of a communication parameter anew is selected automatically depending upon whether the communication parameter is a static or dynamic element, connectability can be improved while processing at the time of connection to the network is lightened. In other words, in the case of a static element, the connection to the network is attempted using the already acquired communication parameter. As a result, the network connection can be achieved without executing automatic setup processing, and connection processing and connection time can be reduced. Further, in the case of a dynamic element, connectability can be improved because automatic setup processing is executed. It should be noted that if the connection cannot be achieved even after a stipulated number of tries in the case where the communication parameter is the static element, it will suffice to execute automatic setting of communication parameters. This enhances connectability further.

FIG. 5 is a flowchart illustrating the flow of operation in a case where terminal C, which is connected to the network 31, leaves the network.

Terminal C connects to the network 31 and is participating in the network (S501).

Monitoring is performed to determine whether terminal C has disconnected from the network 31 (S502). If disconnection from the network 31 has not occurred, then connection to the network is continued.

If disconnection from the network is sensed at S502, then it is determined whether the disconnection is due to an instruction from the user or the result of an incidental event such as a deterioration in the condition of radio waves (S503). If disconnection from the network 31 is sensed in a state in which disconnection from the network has not been instructed by the user, then it is determined that the disconnection is the result of an incidental event.

If it is determined at S503 that the disconnection from the network has occurred owing to an instruction from the user, then the user is notified of disconnection from the network and processing is suspended (S508). The notification at step S508 is carried out by displaying a message on the display unit, by lighting an LED or by issuing a buzzer tone, etc.

Next, if it is determined at S503 that the disconnection from the network that has occurred is incidental and not as the result of user intervention, then control proceeds to step S504. Examples of incidental events that can be mentioned are a case where the wireless environment in which the network 31 exists deteriorates owing to congestion or the like, a deterioration in the wireless environment owing to the presence of a microwave oven or the like, or disconnection because wireless communication time has exceeded a fixed length of time. Other causes besides these all fall under incidental events so long as they result in disconnection not caused by a command from the user.

In a case where a disconnection has occurred owing to an incidental event, it is determined whether a communication parameter utilized thus far is static or dynamic in order to attempt connection again (S504). The concept of static and dynamic elements is the same as that described earlier with reference to FIG. 4.

If the result of the determination at S504 is that the communication parameter is a static element, then re-connection to the network is performed automatically using the communication parameter unchanged (S505). In this case, notification that terminal C left the network 31 is not given to the user.

The result of connection processing executed at S505 is judged (S506). If re-connection to the network 31 could be achieved, control returns to step S501. Here the status of terminal C is caused to transition to "network connection in progress".

If the attempt at re-connection fails, the number of re-connection iterations, which is predetermined, is discriminated (S507). If the predetermined number of iterations has not been reached, it is construed that this is only a temporary connection failure. Accordingly, processing for connecting to the network 31 is executed again (S505).

In a case where connection to the network 31 cannot be achieved even if it has been attempted the predetermined number of times, the user is notified of the fact that terminal C has been disconnected and has left the network 31 (S508). This notification may be made one that is different from that issued when network disconnection is due to an instruction from the user, thereby allowing the user to recognize the fact that the disconnection from the network is the result of an incidental event. It should be noted that the number of retries for re-connection may be plural or only one.

If it is determined at S504 that a communication parameter stored in terminal C is a dynamic element, this means that connection is not feasible even if this communication parameter is used. Accordingly, the user is notified of the fact that terminal C has left the network 31 (S508).

In a case where a user notified of the fact that the terminal has left the network 31 executes re-connection processing, connection processing is executed in accordance with FIG. 4 described earlier.

In accordance with the foregoing, user operation when re-connecting to a network can be alleviated and it is possible to improve operability and connectability.

Although a preferred embodiment of the present invention has been described, the embodiment is an illustration for describing the invention and the illustration does not constitute gist that narrows the scope of the invention solely to this embodiment. Various modifications are possible without departing from the scope of the invention.

Further, the foregoing description has been rendered taking a wireless LAN compliant with IEEE 802.11 as an example. However, the present invention may be implemented also with other wireless media such as a wireless USB, MBOA, Bluetooth (registered trademark), UWB and ZigBee. Further, the invention may be applied also to a wired communication medium such as a wired LAN.

Here "MBOA" is the abbreviation of "Multi-Band OFDM Alliance", and UWB includes wireless USB, wireless 1394 and WINET, etc.

Further, although a network identifier, encryption method, encryption key, authentication method and authentication key have been mentioned as wireless parameters, it goes without saying that other information may be used and that other information may be included in communication parameters.

The object of the invention is attained also by supplying a recording medium storing the program codes of the software for performing the functions of the foregoing embodiment to a system or an apparatus, reading the program codes, which have been stored on the recording medium, with a computer (e.g., a CPU or MPU) of the system or apparatus from the storage medium, and then executing the program codes. In this case, the program codes per se read from the recording medium implement the functions of the embodiment and the recording medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card, ROM or DVD, etc.

Further, besides the case where the aforesaid functions according to the embodiment are implemented by executing the read program code by computer, an operating system or the like running on the computer may perform all or a part of the actual processing based upon instructions in the program code so that the foregoing functions are implemented.

Furthermore, the program code read from the storage medium is written to a memory provided on a function expansion board inserted into the computer or provided in a function expansion unit connected to the computer. A CPU or the like mounted on the function expansion board or function expansion unit performs all or a part of the actual processing based upon instructions in the program code so that the foregoing functions are implemented.

In accordance with the present invention, as described above, it is possible to alleviate user operation performed when an attempt is made to re-connect a communication device, in which a communication parameter has already been set automatically, to a network after the device has left the network temporarily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-041490, filed on Feb. 22, 2008, which is hereby incorporated by reference herein in its entirety.

The invention claimed is:

1. A wireless communication apparatus comprising:
a receiving unit that receives a wireless communication parameter from a parameter-providing apparatus;
a storage unit that stores the wireless communication parameter received by said receiving unit;
a first detecting unit that detects a connection instruction for connection to a wireless network which is connected to by using a wireless communication parameter provided by the parameter-providing apparatus;
a discriminating unit that discriminates whether a wireless communication parameter provided by the parameter-providing apparatus includes a dynamic component;
a connecting unit that connects to a wireless network using a wireless communication parameter provided by the parameter-providing apparatus; and
a determining unit that determines whether the connection instruction has been detected after disconnection from the wireless network has been performed in response to a user instruction,
wherein if the connection instruction has been detected by said first detecting unit, (i) if said discriminating unit discriminates that the wireless communication parameter does not include the dynamic component, said connecting unit connects to a wireless network using the wireless communication parameter that has already been stored in said storage unit, and (ii) if said discriminating unit discriminates that the wireless communication parameter includes the dynamic component, said receiving unit receives a second wireless communication parameter, and said connecting unit connects to a wireless network using the second wireless communication parameter instead of using the wireless communication parameter that has already been stored in said storage unit, and
wherein if the connection instruction has been detected by said determining unit after disconnection from the wireless network has been performed in response to the user instruction, said receiving unit receives a third wireless communication parameter, and said connecting unit connects to a wireless network using the third wireless communication parameter instead of using the wireless communication parameter that has already been stored in said storage unit.

2. The apparatus according to claim 1, further comprising:
a second detecting unit that detects disconnection from the wireless network; and
a notifying unit that notifies a user of disconnection from the network, in accordance with the discrimination by said discriminating unit.

3. The apparatus according to claim 2, wherein said notifying unit notifies the user of disconnection if the wireless communication parameter includes the dynamic component.

4. The apparatus according to claim 1, wherein said discriminating unit discriminates whether the wireless communication parameter already stored by said storage unit includes the dynamic component or a fixed element.

5. The apparatus according to claim 4, wherein the dynamic component corresponds to WPA and the fixed elements corresponds to WEP.

6. The apparatus according to claim 1, wherein said discriminating unit discriminates a type of an encryption key.

7. The apparatus according to claim 1, wherein the wireless network is a wireless LAN compliant with IEEE 802.11.

8. The apparatus according to claim 1, wherein the wireless communication parameter includes one or more of a network identifier, encryption method, encryption key, authentication method, and authentication key.

9. The apparatus according to claim 1, wherein the wireless communication parameter is an encryption key.

10. A control method of a communication apparatus, the method comprising:
receiving a wireless communication parameter from a parameter-providing apparatus;
storing, in a storage unit, the wireless communication parameter received in said receiving step;
detecting a connection instruction for connection to a wireless network which is connected to by using a wireless communication parameter provided by the parameter-providing apparatus;
discriminating whether a wireless communication parameter provided by the parameter-providing apparatus includes a dynamic component;
connecting to a wireless network using a wireless communication parameter provided by the parameter-providing apparatus; and
determining whether the connection instruction has been detected after disconnection from the wireless network has been performed in response to a user instruction,
wherein if the connection instruction has been detected, (i) if it is discriminated that the wireless communication parameter does not include the dynamic component, said connecting step connects to a wireless network using the wireless communication parameter that has already been stored in the storage unit, and (ii) if it is discriminated that the wireless communication parameter includes the dynamic component, said receiving step receives a second wireless communication parameter, and said connecting step connects to a wireless network using the second wireless communication parameter instead of using the wireless communication parameter that has already been stored in the storage unit, and wherein if the connection instruction has been detected after disconnection from the wireless network has been performed in response to the user instruction, said receiving step receives a third wireless communication parameter, and said connecting step connects to a wireless network using the third wireless communication parameter instead of using the wireless communication parameter that has already been stored in the storage unit.

11. A non-transitory computer-readable storage medium storing a program for causing a control method by a wireless communication apparatus to be executed by a computer, the method comprising:

a receiving step of receiving a wireless communication parameter from a parameter-providing apparatus;

a storage step of storing, in a storage unit, the wireless communication parameter received in said receiving step;

a detecting step of detecting a connection instruction for connection to a wireless network which is connected to by using a wireless communication parameter provided by the parameter-providing apparatus;

a discriminating step of discriminating whether a wireless communication parameter provided by the parameter-providing apparatus includes a dynamic component;

a connecting step of connecting to a wireless network using a wireless communication parameter provided by the parameter-providing apparatus; and a determining step of determining whether the connection instruction has been detected after disconnection from the wireless network has been performed in response to a user instruction, wherein if the connection instruction has been detected in said detecting step, (i) if it is discriminated that the wireless communication parameter does not include the dynamic component, said connecting step connects to a wireless network using the wireless communication parameter that has already been stored in the storage unit, and (ii) if it is discriminated that the wireless communication parameter includes the dynamic component, said receiving step receives a second wireless communication parameter, and said connecting step connects to a wireless network using the second wireless communication parameter instead of using the wireless communication parameter that has already been stored in the storage unit, and wherein if the connection instruction has been detected after disconnection from the wireless network has been performed in response to the user instruction, said receiving step receives a third wireless communication parameter, and said connecting step connects to a wireless network using the third wireless communication parameter instead of using the wireless communication parameter that has already been stored in the storage unit.

* * * * *